United States Patent Office 2,978,418
Patented Apr. 4, 1961

2,978,418

WATER EMULSIFIABLE COMPOSITION

Donald W. Parker, Jr., Park Ridge, Ill., assignor, by mesne assignments, to Switzer Brothers, Inc., Cleveland, Ohio, a corporation of Ohio No Drawing. Filed Feb. 15, 1956, Ser. No. 565,529

5 Claims. (Cl. 252—312)

This invention relates to a water emulsifiable composition, and more particularly to an oily liquid composition capable of forming a clear or translucent emulsion with at least 10% of water by volume of the original composition.

The water emulsifiable composition of my present invention has been more particularly developed for use in a non-destructive method of detecting surface discontinuities, such as described and claimed in an application for patent of Taber de Forest and myself, Serial No. 445,496, filed November 4, 1954, now Patent No. 2,806,959, issued September 17, 1957. According to that method, an oily liquid penetrant having excellent penetrating qualities but immiscible with water, and preferably free from any emulsifying agent, is caused to penetrate any surface flaws, or discontinuities. A fluorescent or nonfluorescent dye is usually dissolved in the oily penetrant in order to give a contrasting visual indication of the location and type of surface flaw, or discontinuity, present in the surface undergoing test. After the application of the oily penetrant, an emulsifying liquid is applied over the test surface that is capable, upon substantially static contact with the oily penetrant, of rendering the latter superficially water emulsifiable. In the subsequent washing step with water, it is only the superficial, emulsified layer of the penetrant that is removed with the excess of emulsifying agent, while the unemulsified penetrant that has penetrated any surface discontinuities remains in such discontinuities and serves to indicate the existence and location of the same. The contrasting color effect can be further enhanced by the application to the surface of a developer, either dry or wet. Where the penetrant is contrastingly colored with a visible dye, inspection takes place under "white" light, whereas when a fluorescent dye is dissolved in the penetrant, the inspection is carried out under "black" light.

In order to increase the effectiveness of the emulsifying liquid, I have found that a water emulsifiable composition having certain properties should be employed. Among the properties that are desired are a high water tolerance, a high flash point, non-toxicity, a low evaporation rate, no objectionable odor, and ability to wet a surface covered with an oily penetrant and to emulsify such penetrant. The water emulsifiable composition is also one that does not form a scum on its surface upon exposure to the atmosphere, and it should have little or no tendency to form curds or to ball up when subjected to a spray of water, as in the step of water washing or hosing to remove the water emulsifiable composition and the emulsified excess of the penetrant in the method above described.

With regard to the water tolerance of my water emulsifiable composition, the composition should be capable of taking up at least 10 volume percent of water to form a clear or translucent emulsion. Also, in order to be suitable for use in connection with the non-destructive method of testing above described, my water emulsifiable composition should have a viscosity of at least 30 centistokes at 100° F., and the viscosity should remain fairly constant, although it may be at different levels, after the formation of a water emulsion therewith containing at least 10 volume percent of water. In general, for a low viscosity water emulsifiable composition, a viscosity of around 50 to 55 cs. at 100° F. has been found satisfactory, while for a high viscosity composition, a viscosity of between 110 and 125 cs. at 100° F. has been found suitable.

I have now found that in order to produce a water emulsifiable composition having all of these desirable properties and characteristics one particular chemical compound functions especially well as an emulsifying agent for a wide variety of different oily liquids that can be used in making up the water emulsifiable composition. The chemical compound that I have found to be so eminently suited for the purpose is tri-butoxyethyl phosphate. This is the more surprising in that tri-butoxyethyl phosphate has previously been known as a plasticizer, and has not been known, to the best of my knowledge, to possess any emulsifying properties. Since it is almost insoluble in water, being of the order of 0.1% soluble, or less, it is not a compound that one would ordinarily expect to possess water emulsifying properties. However, when tributoxyethyl phosphate is added in amounts between about 1% and 20% by volume of an emulsifiable oily liquid, such as a cutting oil base, the resulting composition is capable of tolerating unexpectedly large amounts of water to form clear or translucent, stable emulsions. When used as an emulsifying liquid in the non-destructive method of testing for surface discontinuities that is referred to above, it is desirable that the water emulsifiable composition be capable of taking up at least 10 volume percent of water, and even higher proportions, to form clear or translucent, stable emulsions, and this can be easily effected by varying the proportion of tributoxyethyl phosphate within the limits just recited. In some instances, where 15 volume percent of tri-butoxyethyl phosphate is used, the resulting water emulsifiable composition is capable of taking up an equal volume of water to form a clear or translucent, stable emulsion.

It is therefore an important object of this invention to provide a water emulsifiable composition in the form of an oily liquid having a high water tolerance and capable of forming with water emulsions that are stable and that may have many other properties peculiarly adapting them for use in non-destructive, penetrant methods of testing for surface discontinuities.

It is a further important object of this invention to provide compositions having excellent emulsifying properties with respect to both oil and water and containing tributoxyethyl phosphate.

Other and further objects of this invention will become apparent from the following description and appended claims.

In designating the composition of my present invention as a water emulsifiable composition, it will be understood that the composition may, itself, contain water and be capable of being mixed with additional quantities of water to form a relatively clear or translucent, stable emulsion, or the composition may be free of water but capable of forming an emulsion such as described when water is added to it. In order to be a satisfactory emulsifying composition for use in a non-destructive penetrant method of testing for surface discontinuities, such as described above, my water emulsifiable composition should be capable of tolerating a total amount of water, both that normally present in the composition and that deliberately added thereto, of at least 10 volume percent based upon the volume of the non-aqueous constituents of the composition. This basis is used hereinafter and in the claims in expressing the volume percent of water with which my water emulsifiable composition must be completely miscible in order to form a clear or translucent emulsion.

My composition comprises an oily vehicle, which is preferably a mineral oil, such as kerosene, a mineral seal oil, fuel oil, or a lubricating oil, or some mixture of two or more of these various types of oils. The particular oil, or mixture of oils, to be used is selected in accordance with the viscosity that is desired in the final water emulsifiable composition. For instance, mineral seal oil, which is a relatively thin, non-viscous oil, may suitably be mixed with a heavy paraffin oil, which has a viscosity corresponding with that of common lubricating oils, and by a proper adjustment of the respective proportions of these two types of oil it is possible to get the viscosity that is desired in the final water emulsifiable composition.

In addition to a sufficient quantity of tri-butoxyethyl phosphate, as an emulsifying agent, or emulsifying aid, within the volume percent range of between 1 and 20% of tri-butoxyethyl phosphate of the resulting volume of the oil-emulsifying agent mixture, it is generally preferable to include in the oil vehicle, or to add to the oil vehicle, a liquid sulfonation product that is miscible both with water and with oil, keeping the total volume of oily vehicle, i.e. oil plus sulfonate, and, when included, coupling agents, wetting agents and/or detergents, within the same limits of from 80 to 99 volume percent of the whole. An example of such a liquid sulfonation product is a petroleum sulfonate such as can be prepared by sulfonating petroleum oils and then neutralizing, or partially neutralizing, to obtain the alkali metal sulfonates, particularly the sodium sulfonates. Petroleum sulfonate #745, a product of Pennsylvania Refining Company, is an example of a suitable petroleum sulfonate.

Suitable oily vehicles are also available on the market that already contain a sufficient amount of sulfonated oils to render them suitable for use for my purposes, merely upon the addition of a sufficient proportion of tri-butoxyethyl phosphate. Such a product is that known as Twitchell Oil #7231, put out through Emery Industries, Inc., of Cincinnati, Ohio. Twitchell Oil, as available on the market, has a water tolerance of up to 6 volume percent, but when a suitable proportion of tri-butoxyethyl phosphate is added to the Twitchell Oil, its water tolerance can be increased to as high as 100 volume percent. For instance, the addition to 96½ ml. of Twitchell Oil of 3½ ml. of tri-butoxyethyl phosphate raises the water tolerance to 20%, while the addition of 15 ml. of tri-butoxyethyl phosphate to 85 ml. of Twitchell Oil, increases the water tolerance to 100 volume percent. By this is meant that one volume of a mixture of 85 parts by volume of Twitchell Oil and 15 parts by volume of tri-butoxyethyl phosphate is completely miscible with 1 volume of water to give a clear, stable emulsion that does not gel and that maintains a substantially constant viscosity with varying volume proportions of water up to the maximum of water tolerated by the mixture. In the case of the first mentioned mixture of 96½ ml. of Twitchell Oil and 3½ ml. of tri-butoxyethyl phosphate, the viscosity is about 110 centistokes at 100° F. This, then, is a suitable water emulsifiable composition for use where higher viscosity compositions are desired in the non-destructive method of testing above described.

In place of petroleum sulfonates, other oil-and-water miscible sulfonates may be used such as the so-called amine sulfonates, which are available through various sources under such proprietary names as:

G–3300 amine sulfonate, put out by Atlas Powder Company; and believed to be an amine salt of an alkylaryl sulfonate;

P–1059, amine sulfonate, which is put out by Emulsol Corporation and is believed to be isopropyl amine dodecyl-benzene sulfonate;

and others. All of the so-called amine sulfonates are anionic from a functional standpoint.

In addition to the amine sulfonates, various wetting agents or detergents may be used, including non-ionic agents, such as Emcol 61, which is believed to be an isopropyl amide of oleic acid; and Triton X–100, which is put out by Rohm & Haas Co. and believed to be an alkyl aryl polyether alcohol.

It is sometimes desirable to use a glycol or a glycol ether (both of which are broadly included within the term "a glycol," as used herein), as a coupling agent for the oil and the sulfonate employed. Among the glycols that have been found useful are dipropylene glycol, diethylene glycol, diethylene glycol monobutylether and hexylene glycol.

Examples of suitable water emulsifiable compositions within the scope of my invention are as follows:

EXAMPLE 1

| | Percent by volume |
|---|---|
| Petroleum sulfonate 745 | 40 |
| Triton X100 | 5 |
| Dipropylene glycol | 5 |
| Tri-butoxyethyl phosphate | 4 |
| Mineral seal oil 1031 | 8 |
| Heavy paraffin oil 1012 | 38 |
| Xylene Red B 400% | Q.s. |

The resulting water emulsifiable composition of the above formula is a thick, or high viscosity emulsifier having the following properties:

| | |
|---|---|
| Viscosity at 100 degrees F. | 118 cs. |
| Viscosity at 100 degrees F.+10% water | 89.9 cs. |
| Viscosity at 100 degrees F.+20% water | 81.0 cs. |
| API | 16.8. |
| Flash point | 305° F. |
| Water tolerance (vol. percent added) | Up to 25 to 27.5% |

EXAMPLE 2

| | Percent by volume |
|---|---|
| Petroleum sulfonate 745 | 37.0 |
| Triton X100 | 6.0 |
| Dipropylene glycol | 4.5 |
| Tri-butoxyethyl phosphate | 4.5 |
| Mineral seal oil 1031 | 34.5 |
| Heavy paraffin oil 1012 | 10.0 |
| Water | 3.5 |
| Xylene Red B 400% | Q.s. |

A water emulsifiable composition made up in accordance with the formulation of Example 2 has the following typical physical properties:

| | | |
|---|---|---|
| Viscosity at 100° F. | cs | 51.5 |
| Viscosity at 100° F.+10% water | cs | 54.5 |
| Viscosity at 100° F.+18.5% water | cs | 51.2 |
| API | | 19.1 |
| Water tolerance (vol. percent added water) up to in excess of | percent | 22.5 |
| Flash point | ° F. | 300 |

The following examples indicate other suitable compositions, in the first of which the tri-butoxyethyl phosphate is present in substantially the minimum proportion that is practicable for my purposes, and in the second of which the tri-butoxyethyl phosphate is used in about the maximum practicable proportion:

| Material | Example 3, Percent by vol. | Example 4, Percent by vol. |
|---|---|---|
| No. 2 Fuel Oil | 66 | 35 |
| Petroleum sulfonate | 25 | 35 |
| Triton X100 | 3 | 5 |
| Tri-butoxyethyl phosphate | 1 | 20 |
| Water | 5 | 5 |
| Water tolerance (vol. percent added water) | 10 | 100 |
| Viscosity at 100° F., cs | 30 | 45 |

The water emulsifiable compositions of Examples 1 to 4 are suitable for use as emulsifiers in conjunction with the non-destructive method of testing described above.

The compositions of Examples 1 to 4 also meet the emulsion test, which is that a clear or translucent liquid, actually a true emulsion, shall result when 10 parts of the water emulsifiable composition are added to 90 parts (by volume) of water.

Still further examples of suitable formulations of my water emulsifiable compositions are given in the following table:

Table I

| Examples | Percent By Volume | | | |
|---|---|---|---|---|
| | 5 | 6 | 7 | 8 |
| No. 2 Fuel Oil | 75 | | 70 | 70 |
| Kerosene | | 75 | | |
| Petroleum sulfonate | 15 | 15 | 20 | 20 |
| Triton X100 | 4 | 3 | 3 | 3 |
| Tri-butoxyethyl phosphate | 1 | 2 | 1 | 1 |
| Water | 5 | 5 | 5 | 5 |
| Turkey red oil | | | 1 | |
| Diethylene glycol | | | | 1 |

Other water emulsifiable compositions containing an amine sulfonate in place of the petroleum sulfonate are given in the following table:

Table II

| Examples | Percent By Volume | | | | |
|---|---|---|---|---|---|
| | 9 | 10 | 11 | 12 | 13 |
| No. 2 Fuel Oil | | 75 | 75 | 80 | |
| Kerosene | | | | | 75 |
| Mineral Seal Oil | 75 | | | | |
| Amine sulfonate, P1059 | 20 | 15 | 15 | 10 | 15 |
| Triton X100 | | 2 | 2 | 1 | |
| Emcol 61 | | 1 | 1 | 1 | 1 |
| Tri-butoxyethyl phosphate | 5 | 1 | 1 | 2 | 2 |
| Water | | 4 | 4 | 4 | 4 |
| Turkey red oil | | 2 | | | 3 |
| Ethylene glycol | | | 3 | 2 | |

In general, the combined volume of oil and sulfonate, either petroleum sulfonate or amine sulfonate herein and in the claims termed the "non-aqueous constituents," can be varied between 80 and 99%, and the volume of the tri-butoxyethyl phosphate can be varied between 20 and 1% of the total volume of the composition, to give a composition having a viscosity of at least 30 centistokes at 100° F., and such composition will be satisfactory for use as the emulsifying agent in the method described and claimed in the aforesaid pending application of Taber de Forest and myself. Ordinarily, however, it is not economically desirable to go over 15 volume percent of the tri-butoxyethyl phosphate in the final composition, and a very satisfactory formulation is one containing about 4 volume percent of tri-butoxyethyl phosphate.

In place of Triton X 100, other non-ionic, and also anionic, wetting agents may be used. Also, where a particular glycol has been specified, any of the other glycols, including glycol ethers, can be substituted.

On the other hand, although many different phosphate esters and butyl esters have been tried out, none of them has been found to be so satisfactory as tri-butoxyethyl phosphate. This is all the more surprising since many of the phosphate and butyl esters are substantially as good plasticizers as is tri-butoxyethyl phosphate. That tributoxyethyl phosphate acts as an emulsifying agent or as an emulsifying aid is wholly unexpected. It is completely astounding and novel that tributoxyethyl phosphate, a plasticizer, has the ability both to improve greatly the water tolerance and the effectiveness of emulsification of an oily water emulsifiable composition and also to prevent any substantial increase in viscosity when water is added rather than gelling up as would otherwise be the normal case.

It will be understood that modifications and variations may be effected without departing from the scope of the novel concepts of the present invention.

I claim as my invention:

1. A water-emulsifiable liquid composition consisting essentially of between 80 and 99% by volume of non-aqueous constituents consisting essentially of an oil and an oil-miscible sulfonate selected from the group consisting of alkali metal petroleum sulfonates and amine alkyl-aryl sulfonates, the oil to sulfonate volume ratio ranging from about 1:1 to about 8:1 and between 20 and 1% by volume of tri-butoxyethyl phosphate, the proportion of the latter being sufficient to render said composition capable of forming stable water emulsions containing from at least 10 to 100 volume percent of water based upon the non-aqueous constituents of said composition and a higher volume percent of water than would be possible in the absence of said tri-butoxyethyl phosphate, said liquid composition having a viscosity of at least 30 centistokes at 100° F.

2. The composition of claim 1, in which the oil vehicle consists essentially of a mineral oil and the oil-miscible sulfonate is a petroleum sulfonate.

3. A water-emulsifiable liquid composition having a viscosity of at least 30 centistokes at 100° F. and being miscible with at least 10% of water to form a clear liquid having approximately the same viscosity, said composition consisting essentially of between 80 and 99% by volume of non-aqueous constituents consisting essentially of an oil and an oil-miscible sulfonate selected from the group consisting of alkali metal petroleum sulfonates and amine alkylaryl sulfonates, and including a water soluble coupling agent for the oil and the selected oil-miscible sulfonate that is selected from the class consisting of dipropylene glycol, diethylene glycol, diethylene glycol monobutylether and hexylene glycol, and tri-butoxyethyl phosphate in an amount equivalent to at least 1% by volume of said composition and sufficient to give a clear liquid when 10 parts of said composition are added to 90 parts by volume of water, the oil to sulfonate volume ratio ranging from about 1:1 to about 8:1, and the coupling agent being present in an amount up to about 5% by volume of said composition.

4. The composition of claim 3 in which the oil is a mineral oil.

5. A water-emulsifiable liquid composition consisting essentially of about 46 parts of a mineral oil, 40 parts of an alkali metal petroleum sulfonate, 5 parts of a water soluble coupling agent for the oil and the selected oil-miscible sulfonate that is selected from the class consisting of dipropylene glycol, diethylene glycol, diethylene glycol monobutylether and hexylene gycol, 5 parts of a synthetic organic non-ionic wetting agent and 4 parts of tri-butoxy-ethyl phosphate, all parts being by volume and said composition having a viscosity of at least 30 centistokes at 100° F. and being capable of forming a clear liquid when 10 parts of said composition are added to 90 parts by volume of water.

References Cited in the file of this patent

UNITED STATES PATENTS

| | | |
|---|---|---|
| 2,391,087 | Donlan et al. | Dec. 18, 1945 |
| 2,430,400 | Hoelscher | Nov. 7, 1947 |
| 2,480,638 | Duncan et al. | Aug. 30, 1949 |
| 2,629,696 | Dodd et al. | Feb. 24, 1953 |
| 2,629,697 | Langdon et al. | Feb. 24, 1953 |
| 2,692,859 | Talley et al. | Oct. 26, 1954 |
| 2,723,237 | Ferrin | Nov. 8, 1955 |
| 2,759,962 | Zenftman et al. | Aug. 21, 1956 |
| 2,765,255 | Swarbrick | Oct. 2, 1956 |
| 2,794,004 | Ratti | May 28, 1957 |

FOREIGN PATENTS

| | | |
|---|---|---|
| 538,408 | Great Britain | Aug. 1, 1941 |